June 21, 1949.　　　　J. R. ORELIND　　　　2,473,967
SPEED CONTROLLED CENTRIFUGAL VALVE
Filed May 9, 1947
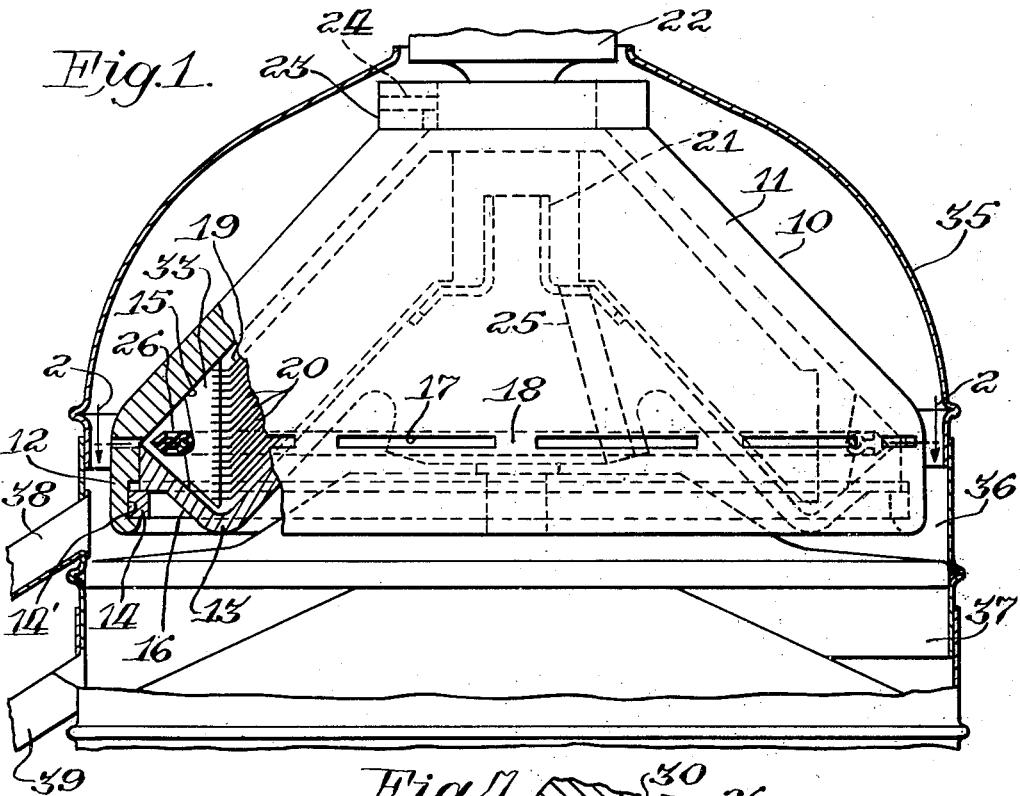
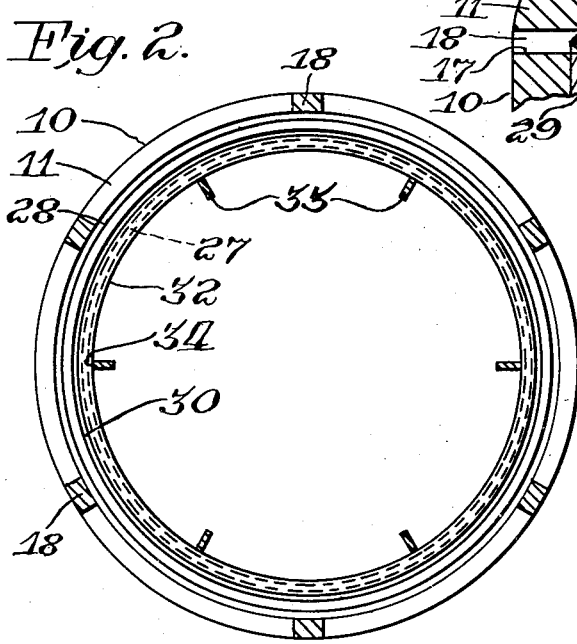
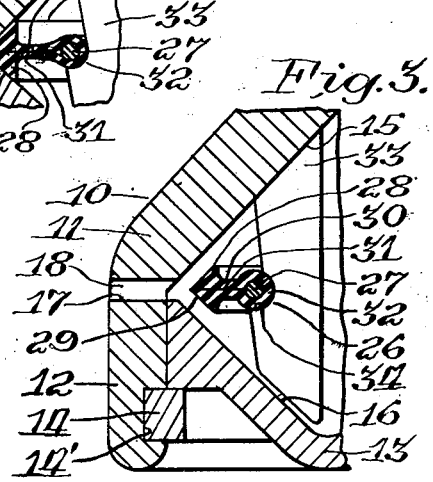
INVENTOR.
John R. Orelind Patented June 21, 1949

2,473,967

UNITED STATES PATENT OFFICE 2,473,967

SPEED CONTROLLED CENTRIFUGAL VALVE

John R. Orelind, Wilmette, Ill., assignor to International Harvester Company, a corporation of New Jersey Application May 9, 1947, Serial No. 747,042

6 Claims. (Cl. 137—140)

This invention relates to a centrifugal separator, and particularly to a centrifugal separator for separating whole milk. More specifically, it relates to a power washing cream separating bowl having an improved valve means for regulating the discharge of a washing medium from said bowl.

It is a prime object of this invention to provide an improved centrifugally operable valve construction for a cream separating bowl of the power flushing type.

It is another object to provide an expansible valve means for regulating the peripheral discharge opening of a cream separating casing or bowl, said valve means including a rigid ring which is securely positioned within the separating bowl.

Still another object is to provide a resilient expansible valve ring for regulating the peripheral discharge opening of a cream separating bowl, said valve ring including an annular sealing portion having a radially inwardly extending web of substantially less thickness than said sealing member, said web having its inner end rigidly secured to a rigid ring carried within the bowl.

A still further object is to provide a resilient expansible valve ring for a cream separating bowl of the type having inner inclined or converging surfaces sloping toward a washing liquid discharge outlet, said valve ring including a sealing member having V-shaped surfaces adapted to cooperate with the inclined surfaces of the casing for closing said discharge opening at a predetermined speed of rotation of said casing.

It is another object to provide a valve ring for regulating a peripheral discharge opening of a power washing cream separating bowl, said valve ring being inexpensive and simple to manufacture and also providing positive means for regulating the discharge of washing liquid from said bowl.

Other objects will become more readily apparent upon reading the annexed description when examined in conjunction with the drawing.

In the drawing:

Fig. 1 is a sectional view in elevation through a centrifugal separating structure showing a section through a portion of a cream separating bowl or casing;

Fig. 2 is a sectional view taken along the line 2—2 of Fig. 1;

Fig. 3 is an enlarged sectional view of the outer portion of a cream separator bowl showing a valve construction therein; and Fig. 4 is a sectional view similar to Fig. 3 showing an expanded or sealing position of a centrifugally operable valve ring.

Referring particularly to Figure 1, a rotatable cream separating bowl or casing is generally designated by the reference character 10. The casing 10 includes an upper bowl shell 11 having a downwardly extending annular member or rim 12. The rim 12 is adapted to receive in telescoping relation a lower bowl portion 13. A retaining ring 14 is in abutment with the peripheral edge of the lower bowl portion 13 and also is in engagement with an annular recess 14' formed in the rim 12 for retaining said upper bowl shell 11 and said lower bowl portion 13 in telescoping assembled relation. The bowl 10 is provided with annular inner sloping walls or inclined surfaces 15 and 16 which converge toward the maximum internal periphery of the bowl. A substantially continuous discharge opening 17 is formed in the upper bowl shell 11 near the apex of the inclined surfaces. A plurality of radially spaced spacer portions 18 are integrally formed in the upper bowl shell 11. These spacer portions 18 are best shown in Figs. 1 and 2. A disk pack 19 is positioned within the bowl and includes a plurality of separating disks 20. The disk pack is of conventional design and structure and need not further be described. The separating bowl 10 includes the usual milk supply tube 21 for receiving the whole milk from a supply can nozzle 22. A collar 23 is provided at the upper end of the cream separating bowl 10 and this collar is provided with a skim milk outlet 24 of conventional design. A cream outlet 25 is provided within the bowl structure.

The substantially continuous peripheral discharge opening 17 is adapted to be controlled by means of an annular centrifugally expansible valve ring or structure 26. The valve structure 26, as best shown in Figs. 3 and 4, includes a rigid metallic ring 27 which is spaced radially inwardly of the discharge opening 17. An annular V-shaped expansible or resilient sealing member 28 is positioned adjacent to but inwardly of said discharge opening 17, said sealing member being concentric therewith. The sealing member 28 is provided with diverging sides or surfaces 29, said surfaces being of substantially the same angular inclination as the inner sloping walls 15 and 16 of the bowl 10. Formed integrally with the annular V-shaped sealing member 28 is a relatively narrow resilient web or annular wall 30 which extends radially inwardly from said sealing member. As best shown in Figs. 3 and 4 the sealing member 28 and the web 30 are split centrally along the line 31. The valve structure 26 may be manufactured from a resilient material such as rubber, neoprene, or synthetics having particular resilient and expansible properties. During manufacture an end portion 32 of the valve ring 26 is looped around a rigid ring 27 and the rubber is vulcanized along the line 31, thus providing a compact valve structure. The ring 27 may be metallic or may be manufactured of any suitable material having sufficient rigidity. A plurality of wings or supporting members 33 project radially downwardly from the upper bowl shell 11. These members are provided with recesses 34 at their outer edges. During assembly the expansible valve structure 26 is placed over the outer edges of the wings 33 until the loop portion 32 and metal ring 27 are firmly seated within the recess 34 of the wings 33.

A tinware structure 35 is formed around the separating bowl 10. This structure consists of a milk receiving chamber 36 and a cream receiving chamber 37. The tinware structure is provided with a milk discharge spout 38 and a cream discharge spout 39 for discharging the separated products of the cream separating operation.

In the operation, the cream separating bowl 10 is rotated and brought to a sufficiently high separating speed whereupon the material to be treated is separated into lighter and heavier particles in the conventional manner. During this high speed of rotation the expansible valve structure is influenced by the centrifugal force to firmly seat over the discharge opening 17 and thereby firmly seal said opening against said discharge of fluid from the bowl. As best shown in Figure 4, the sealing member 28 is in firm engagement with the inclined inner surfaces or walls 15 and 16 of the separating bowl. In view of the inclined surface 29 of the sealing member 29, an effective seal is provided between the surfaces of the inclined walls of the bowl. The metal ring 27 is rigidly positioned in the recess 34 of the wings 33 regardless of the speed of rotation of the bowl and therefore the greatest resiliency and stretch is within the expansible web 30, which is of relatively less thickness than the sealing member 28. It should therefore be noted that the speed of rotation at which the expansible valve 26 moves radially outwardly for engagement with the inclined walls is determined by the relative thickness of the web 30 with respect to the enlarged sealing member 28. Thus by increasing or decreasing the thickness of this web, control of the movement and expansion of the valve ring may be effected. In rings of this type it is extremely necessary that sealing action or outward expansion of the ring does not occur until a sufficiently high speed has been reached. By shaping the valve ring in the novel manner indicated, effective control is provided.

After the separating operation has ended, it is desired to flush the interior parts of the bowl with a washing liquid or water. In order to secure proper and efficient flushing of the bowl parts, it is necessary that the washing liquid be evacuated through the discharge opening 17. The speed of rotation of the bowl therefore is lowered until the centrifugal force is decreased sufficiently to permit the expansible valve structure to contract into its radial inwardmost position as shown in Fig. 3. The discharge opening 17 is thereupon completely opened and the washing liquid may pass outwardly of the separating bowl. By shaping the expansible valve in the manner indicated, applicant has provided a novel, inexpensive and efficient sealing valve which provides for accurate control of the discharge opening of the separating bowl.

It should thus be apparent that the objects of the invention have been fully achieved and it must be understood that changes may be made which do not depart from the spirit of the invention as disclosed or as defined in the appended claims.

What is claimed is:

1. A centrifugal valve structure including a rigid ring adapted to be positioned for rotation about its own axis, a radially outwardly extending annular resilient expansible member connected to said ring, said expansible member having an annular resilient web portion connecting it to the ring and a substantially larger annular resilient sealing member connected to the outer periphery of said web portion, said sealing member being adapted to be positioned adjacent to and inwardly from an annular discharge opening, said resilient sealing member being arranged and constructed to expand outwardly under the influence of centrifugal force during rotation of said ring thereby sealing the annular discharge opening.

2. A rotatable centrifugal valve structure including a metallic ring adapted to be positioned for rotation about its own axis, a rubber ring extending radially outwardly from said metallic ring, said rubber ring including means supporting said rubber ring adjacent to and inwardly from a discharge opening, said rubber ring having an enlarged sealing surface at its outer periphery and a relatively thin resilient annular wall connected at its inner periphery to said metallic ring, the rubber ring being arranged and constructed to expand outwardly under the influence of centrifugal force during rotation of said valve structure whereby said sealing surface engages and seals said discharge opening.

3. A rotatable valve structure including a rigid ring adapted to be supported for rotation about its own axis, a radially outwardly extending annular resilient member connected to said ring, said resilient member having an annular web portion connecting it to the ring and a substantially larger annular resilient sealing member connected to said web portion, said sealing member having means adapted to position said member adjacent to and inwardly from a discharge opening, said resilient member and said sealing member being constructed and arranged to expand outwardly under the influence of centrifugal force during rotation of said rigid ring whereby the sealing member engages and seals the discharge opening.

4. A centrifugal valve structure including an annular resilient expansible member adapted to be positioned adjacent to and inwardly from a discharge opening, said resilient expansible member including a relatively larger annular resilient sealing member at its outer periphery and a substantially narrow annular resilient web extending radially inwardly of the sealing member, means adapted to rigidly support the inner periphery of the web on a rotatable member, said means including a plurality of radially disposed supporting members engaging the expansible member, and said sealing member being movable outwardly under the influence of centrifugal force whereby the sealing member engages and seals the discharge opening.

5. A rotatable centrifugal valve structure including a ring adapted to be rigidly supported within a rotatable casing, a radially outwardly extending annular resilient member connected to said ring, said resilient member having an annular relatively thin resilient web portion connected at its inner periphery to said ring, a relatively larger annular resilient sealing member connected to the outer periphery of said web portion, said sealing member being adapted to be positioned adjacent to and inwardly from a discharge opening, said sealing member including diverging side surfaces, said annular resilient member being arranged and constructed to expand radially outwardly under the influence of centrifugal force during rotation of the casing whereby the diverging side surfaces of the sealing member engage and seal the discharge opening.

6. A rotatable valve structure including an annular resilient member adapted to be positioned radially inwardly from and adjacent to a discharge opening, said resilient member having a V-shaped outer sealing member, a relatively narrower web portion connected to said V-shaped sealing member and extending radially inwardly with respect thereto, and a supporting member connected to the inner periphery of the web throughout the length thereof, said resilient member being constructed and arranged for rotation whereby said resilient member expands radially outwardly and said V-shaped sealing member engages and seals the discharge opening.

JOHN R. ORELIND.

REFERENCES CITED

The following references are of record in the file of this patent:

UNITED STATES PATENTS

| Number | Name | Date |
|---|---|---|
| 529,662 | Naylor | Nov. 20, 1894 |
| 2,427,779 | Haines et al. | Sept. 23, 1947 |

FOREIGN PATENTS

| Number | Country | Date |
|---|---|---|
| 23,115 | Great Britain | Nov. 11, 1912 |
| 45,039 | Denmark | Dec. 14, 1931 |
| 576,524 | Germany | May 11, 1933 |